Patented May 8, 1951

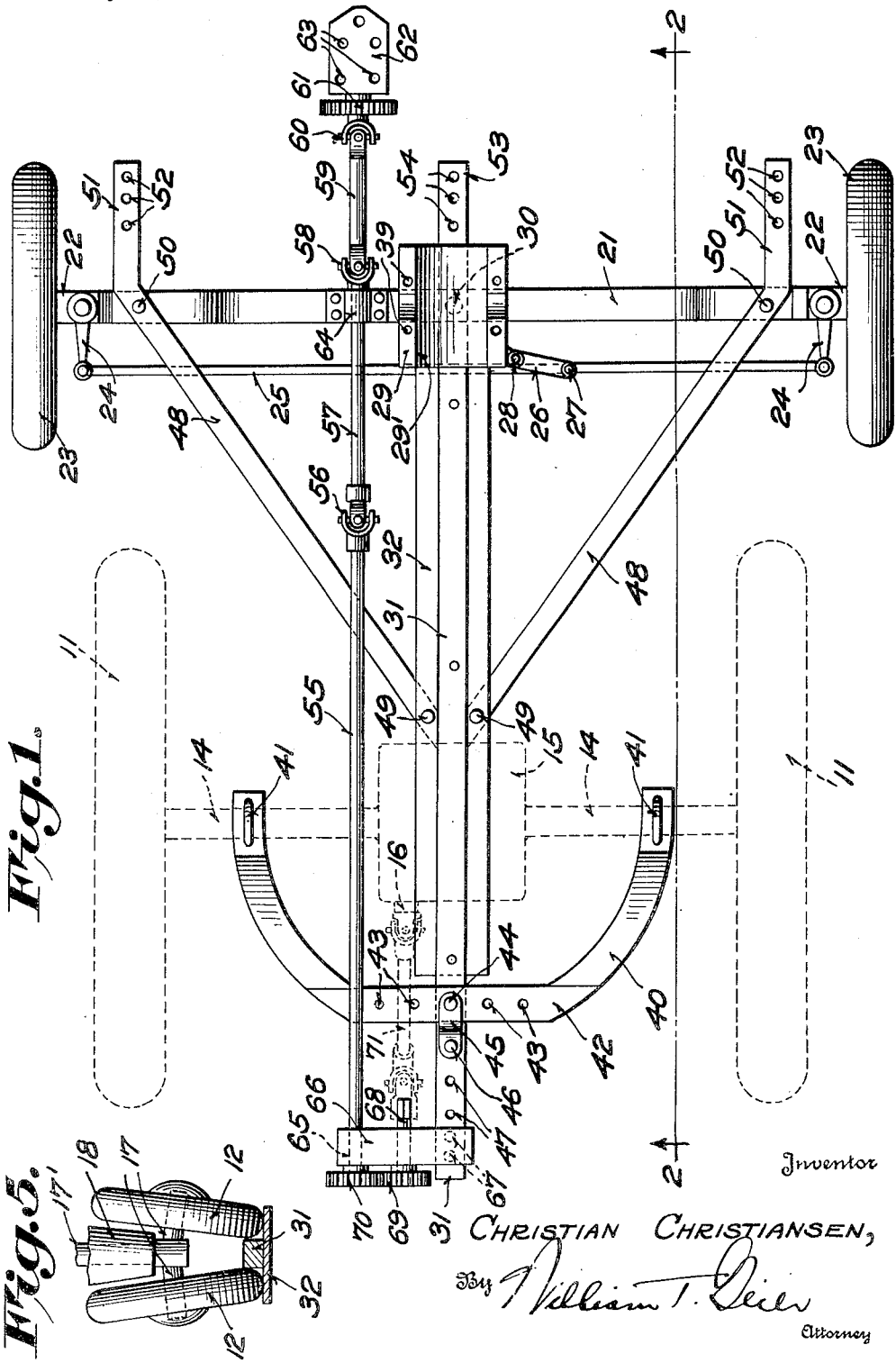

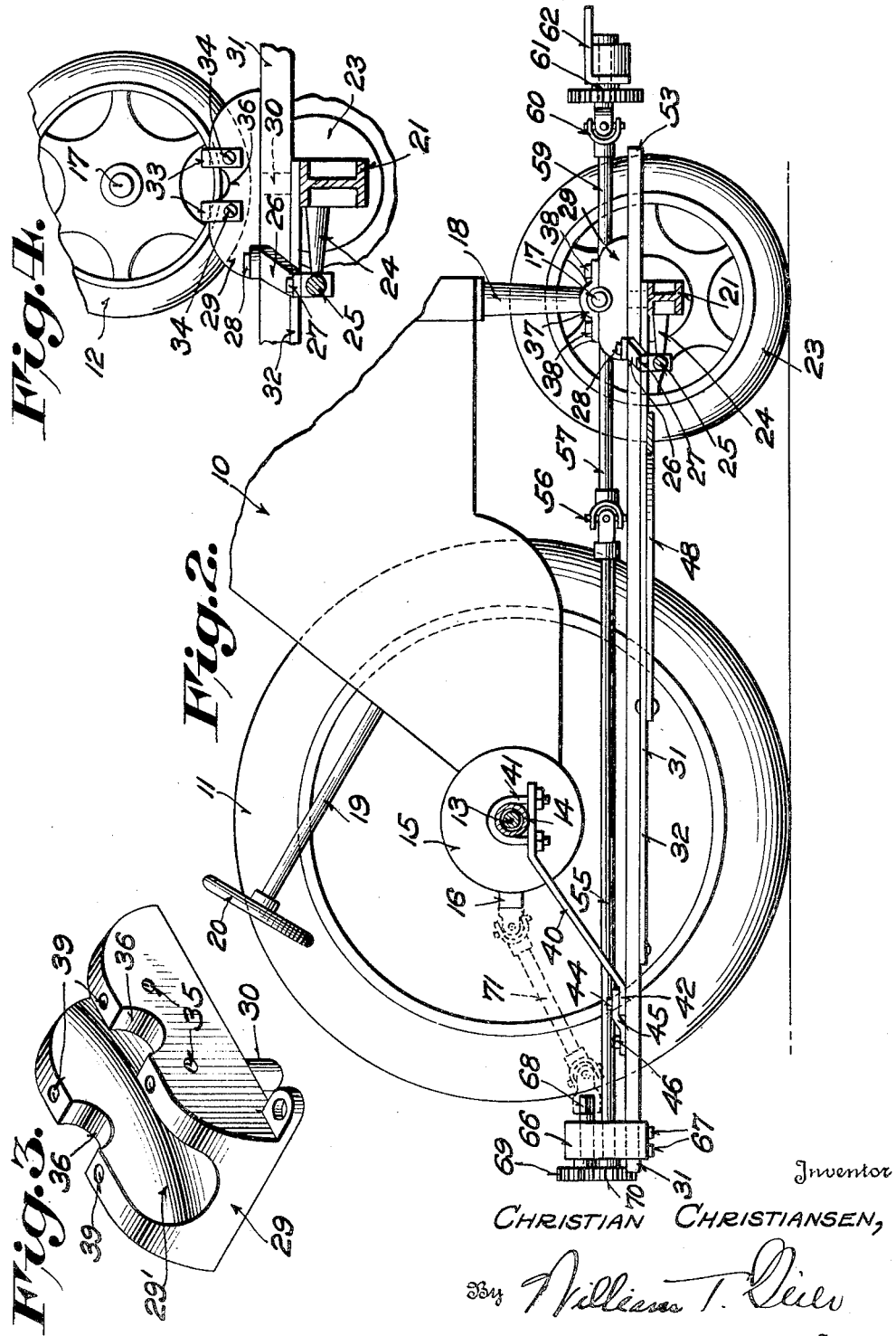

2,551,725

UNITED STATES PATENT OFFICE 2,551,725

TRACTOR AND IMPLEMENT MOUNTING

Christian Christiansen, St. Cloud, Minn.

Application May 13, 1948, Serial No. 26,865

3 Claims. (Cl. 280—87)

This invention relates to tractors, and more particularly to those generally known as farm tractors. It has especially to do with an interchangeable supplemental or auxiliary steering axle provision adapted for application to an ordinary farm tractor of the type usually used to pull farming attachments placed at the rear thereof but is not well, if at all, adapted for the pushing of such attachments placed at the front thereof, whereby such tractors can still be used to good advantage for the implement-pulling kind of work but also to equally as good and even better advantage in connection with pusher-types of implements of various characters in farm practice.

Usually, and in heretofore general practice, special tractors have been provided, and necessarily so, for the mounting, carrying and pushing of front-attached farming implements, devices and apparatus, for which purpose the front steering axle constructions and arrangements must be of wide gauge and special strength; and, of course, this type of tractor is rather expensive, it being the more costly to produce and maintain in use.

Both the pusher and the puller types of tractors have requisitely strong and powerful rear end structural provisions and arrangements, together with preponderance of weight in that region for traction and motive quality, but the usually provided puller type of tractor has at its front end a very narrow-gauge steering ground wheel construction and arrangement, in most cases a pair of downwardly converged or closely arranged pair of slanting toed-in ground wheels mounted rotatably on the cross arms (as spindles) of a vertical, inverted, substantially T-shape shaft, fitted rotatably in a depending pedestal or bearing column at the middle of the chassis; or, in some cases, there is provided only a single caster-type of steering ground wheel; and, in either case, the front end structure of the tractor is of comparatively light weight and not sufficiently strong for the mounting, carrying and pushing of implements, devices or apparatus placed for operation at the front of the tractor.

An object of the present invention is to produce a supplemental or auxiliary front steering axle construction and arrangement of a relatively wide gauge, of ample strength for the mounting thereon and carrying and pushing of several different kinds of attachments used in farming practice, without necessitating any alteration in the attachments or the tractor itself.

A special object is to produce a front steering axle assembly capable of application to the ordinary tractor having the narrow-gauge steering ground wheel provision and being of comparatively light-weight and none too strong in front end structure, so that by such application the tractor may be used effectively, with high efficiency and without imposing any undue strains on the tractor structure itself; and, by which provision, there is effected a practical economy in the cost of farm machinery and equipment.

Other objects and advantages to be attained will hereinafter appear in the following description in conjunction with the accompanying drawings illustrative of a practical but non-limiting exemplification of the invention, wherein:

Figure 1 is a top plan view, showing in full lines a steering axle provision of the present invention, and in dotted lines the rear driving axle and directly associated parts of the tractor to which the steering axle provision is applied, together with a means of connecting the usual power take-off of the tractor with an implement driving means provided in the steering axle assembly;

Figure 2 is a longitudinal vertical section taken on or about the line 2—2 of Figure 1, with the directly associated parts of the tractor as well as the steering axle provision of the applied present invention shown all in full lines, and the connection with the power take-off of the tractor in dotted lines, the application of steering axle provision of the present invention being accomplished with the regular steering ground wheel of the tractor removed;

Figure 3 is a perspective view of the turntable element or rotatable steering saddle member detached;

Figure 4 is a fragmentary side elevational view illustrative of how the front axle provision of the present invention may be applied to the tractor without removing the regular steering ground wheel from the tractor, and Figure 5 is a fragmentary view illustrating how the regular steering ground wheels of the tractor ride up on the trackway afforded by the provision of the longitudinal plate member on the underside of the pusher bar of the steering axle provision of the present invention.

Referring now to the drawings in detail, and first more particularly to Figure 2, the numeral 10 designates the more or less schematically shown upper body and main chassis-carried portion of an ordinary farm tractor. This portion 10 houses the motor, steering mechanism, and certain other parts of the tractor (not shown).

The represented tractor is of the type having a pair of rear ground wheels 11 of relatively large diameter, and, for farm purposes, these wheels are the main carriage and driving wheels and they are spread a definite distance apart.

A relatively narrow provision of a closely associated pair of steering ground wheels 12, usually downwardly convergent or toed-in (see Figure 5 for illustration) is made at the front part of the tractor, or, in some cases, instead of the pair of regular steering wheels as just above described, there may be provided a single caster-swiveled-type of front steering wheel. However, the general practice is to provide the pair of steering ground wheels 12 and it is for use in connection with such provision that the supplemental or auxiliary axle of the present invention is primarily designed.

The rear ground wheels 11 are mounted on driving axle sections, such as 13, mounted rotatably in hollow tubular axle casings 14 joined midway between their outer ends by a housing enlargement 15 containing a different gearing (not shown) for the axle sections 13 and also containing, in most cases, a power take-off provision which is not shown in detail, because obvious and well known, but an external attaching part 16 is indicated merely schematically in Figures 1 and 2 of the drawings.

A steering mechanism is obviously provided but the major portion of this is not shown because housed in the main body portion 10 of the tractor. Suffice it to say that the pair of steering ground wheels 12 are journalled on oppositely disposed, slightly inclined spindle members 17 constituting the cross-head of an inverted, substantially T-shape, vertically disposed shaft 17' journalled rotatably in a pedestal or bearing column 18 depending medially at the forward end portion of the tractor body 10. This shaft 17' is rotated by the steering mechanism (not shown) in the tractor body 10. However, a conventional steering post 19 and a handwheel 20 for operating the steering mechanism of tractor is indicated more or less schematically in Figure 2 of the drawings.

In cases where a type of single steering ground wheel is provided, the mounting of wheel, of course, will be different in some respects from that just above described for the pair of steering wheels 12. However, the steering mechanism will be the same or quite similar for both the double and the single wheel provisions.

The supplemental or auxiliary steering axle provision of the present invention comprises an axle body 21, in general form similar to that of a conventional front axle assembly for an automobile or other regular motor vehicle. That is to say, the axle body 21 has knuckle-jointed spindle members 22 at each end, the same having journalled thereon ground wheels 23.

The spindle members 22 have rearwardly extended lever arms 24 which are hingedly attached to a cross-connector rod or bar 25 extending parallel with the axle body 21. When this cross-connector bar or rod 25 is moved longitudinally of itself, the ground wheels 23, through the knuckle-jointed mountings 22 and the lever arm provisions 24, are accordingly turned in one direction or the other and thus change the direction of travel of the axle body 21, and of course, that of the tractor to which the axle body is applied, as will be presently more fully described.

For operating the cross-connector bar or rod 25, the same is hingedly connected to a link 26, as at 27, and the link is in turn connected, as at 28, to a channeled or open-ended trough-like saddle member or turntable 29 which is mounted to rotate about a vertical axis on the axle body 21 approximately midway between the ends of the body (see Figure 1).

The pivotal mounting of the member 29 may be effected by any suitable or approved means. However, as shown in Figure 3, this members 29 has a depending central stem or shank portion 30 which is fittable rotatably in a suitable bearing aperture provided therefor in the axle body 21. In the present showing the aperture in the axle body is in registration with apertures provided also in a pusher bar 31 and a track-plate 32 secured longitudinally on the underside of said pusher bar, and both the bar and the plate are secured and supported at their forward end portions on the axle body 21 as will be presently more clearly described.

The channel or trough-like portions 29' of the saddle member or turntable 29 is of a width to receive therein, with a comparatively close fitting, the lowermost portions of the toed-in steering ground wheels 12 of the tractor (see Figure 4 for illustration) in which relation the wheels 12 are held by angular brackets or chuck members 33 which are fastened by screws 34 (see Figure 4) inserted in screw-threaded apertures 35 (see Figure 3) provided in side faces of the member 29. The upper angular end portions of the brackets or chuck members 33 thus overhang the adjacent rim portions of the wheels 12 with locking effect so that the wheels are retained securely in the channel or groove 29' of said saddle member or turntable 29.

In other applications of the supplemental or auxiliary axle 21 to the tractor, the steering ground wheels 12 may be, and they usually are, removed from the tractor. In such cases the spindle portions 17 of the swivel shaft 17' are rested in notches 36 provided for the purpose in the side wall portions of the saddle member or turntable 29 (see Figure 3) for clearer showing of the notches 36. The spindle portions 17 are retained in place in the notches 36 by arched bearing straps 37 (see Figure 2) which secured to the member 29 by screws 38 inserted in screw-threaded apertures 39 provided for the purpose in the top faces of the side wall portions of said member 29 (see Figure 3).

By the placing of the wheels 12 or the spindles 17 on the saddle member or turntable 29, as just above described, the axle body 21 is steered by the operator on the tractor turning the handwheel 20 and thereby rotating the regular steering mechanism and gearing of the tractor.

It is here noted, that for the purposes of the present invention, the axle body 21 is usually formed as of the dropped or underslung type. That is to say, its middle or intermediate portion is in a plane or at a level somewhat lower than that of the axes of the ground wheels 23 at the end of the axle body. This is to bring the middle portion of the axle body 21 relatively close to the ground, so that, when the tractor has its front end portion mounted with the spindle portions 17 of the swivel shaft 17' seated in the notches 36 of the saddle member or turntable 29, the main body portion 10 of the tractor is approximately in its normal substantially horizontal position; or, if the original steering ground wheels 12 are not removed from the tractor and are seated in the channel or groove 29' of said member 29, the tractor body portion 10 is not raised appreciably or objectionably at an undue forward and upward inclination such as might possibly be the case if the axle body 21 were at a higher elevation above the ground. This is a particularly essential feature of the invention, that is to say, while provision is made for practically and effectively mounting and carrying pusher types of farming equipment at the front of the tractor, which is of particular advantage in that the operator of the tractor has clear vision ahead at all times, whereby steering and manipulative control is greatly facilitated, both the tractor body portion 10 and the pusher elements provided for the axle body 21 and attached operatively to the tractor (as will be presently described in full detail) are alined substantially truly horizontal. This substantially horizontal relation of the said parts to the ground is also of material advantage in effectively pushing the mounted and carried implements or apparatus in use with minimum imposition of side thrusts upon the parts of the tractor or the supplemental or auxiliary steering axle assembly.

The pusher bar 31, which, as hereinabove stated, is secured with its forward end portion supported on the middle portion of the axle body 21 and beneath said saddle member or turntable 29, is extended rearwardly with ample elongation so that its rear end projects, generally, at least closely adjacent the extreme end of the tractor, or, as shown, a little beyond.

The track-plate 32 also extends rearwardly at least from a vertical plane coincident with that of the inner end of the saddle member or turntable 29, but, as shown, preferably from a position well under said member 29 to near the rear end of the pusher bar 31. This track-plate 32, riveted, bolted or otherwise fastened to the underside of the bar 31, permits the making of the bar in minimum weight, as it appreciably flanges and stiffens the bar against horizontal and lateral buckling and bending and also is resistant to vertical bowing and bending. In addition to this important advantage, the plate 32 is provided on the bar 31 for the especial purpose of affording a trackway having a longitudinal rib at the middle of its top face, whereby the pair of steering ground wheels 12 of the tractor can ride guidedly on the exposed lateral face portions of the plate in straddling relation to bar 31.

In practice, to apply the supplemental or auxiliary steering axle of the present invention to the tractor, the rear end of the pusher bar 31 can be allowed to rest on the ground and the tractor then driven forward so that its pair of steering ground wheels 12 will ride up on the inclined track-plate 32 which thus serves as a ramp leading directly to the channel or groove 29' of the saddle member or turntable 29.

When the wheels 12 have reached the member 29 and entered the channel or groove 29' they may be either fastened in place by applying the brackets or chuck members 33, or else the wheels may be removed and the spindle portions 17 then seated in the notches 36 of the member 29 and secured in place by the strap members 37. After the front end of the tractor is thus mounted on and secured to the supplemental or auxiliary steering axle body 21, the rear end portion of the pusher bar 31 is lifted and secured to the tractor in the region of its relatively heavy and strong rear driving axle housing 14 by some suitable means of attachment, a practical example of which will now be described.

As shown in the drawings, a draft element in the form of a yoke 40 is secured at its ends to the driving axle housing tubes 14 (see Figures 1 and 2) by straps or U-bolts 41. The transverse middle portion 42 of the yoke 40 is located sufficiently below the body 10 of the tractor to engage and support the rear portion of the pusher bar 31 with the bar substantially horizontal as indicated in Figure 2. This transverse portion 42 of the yoke 40 is provided with a multiplicity of apertures 43 in one of which is inserted a retainer bolt 44 that is received also in an aperture provided in an angularly offset clip or bracket member 45 secured by a bolt 46 to the pusher bar 31.

The bar 31 is provided with a series of apertures 47 disposed longitudinally thereof for selective reception of the bolt 46 whereby the clip or bracket member 45 can be secured in different longitudinally adjusted positions on said bar 31. By this means the supplemental or auxiliary axle body 21 can be adjusted closer to or farther from the rear axle assembly of the tractor. The series of apertures 43 in the transverse portion 42 of the yoke 40 and the provision of the attaching U-bolts permit transverse adjustment in the mounting of the longitudinal pusher bar 31 on the tractor.

The axle body 21, as shown, is braced relative to the longitudinal pusher bar 31 by triangularly disposed brace-bars 48 which are secured at their convergent inner ends to the track-plate 32, as at 49, and adjacent their outer ends to the axle body 21, as at 50 (see Figure 1).

For the attaching of different farming implements to be carried at the front of the tractor, the forward ends of the brace bars 48 are extended, as at 51, and provided with apertures 52 to obviously receive securing bolts or the like. So, too, the pusher bar 31 is extended at its forward end, as at 53, and provided with a series of apertures 54 for attaching farming implements and the like. In this connection, it is here noted that other means of attachment may be obviously provided and substituted in lieu of the means shown.

Any suitable means for transmission of power to the attached farming implements or apparatus may be provided. However, as an example of such provision, a power shaft 55 is shown as connected by a universal coupling 56 to another shaft section 57, which latter is in turn connected by a universal coupling 58 to a third shaft section 59. The section 59 is connected by a universal coupling 60 to a stub-shaft 61 journaled in a bracket type bearing member 62 which is apertured, as at 63, or otherwise provided for attachment to a farming implement or apparatus attached to the tractor.

Any suitable means for compensating adjustment of the power shafting just above described may be provided. However, as indicated in the drawings, the shaft section 57 is mounted longitudinally slidable in a bearing 64 provided on the axle body 21, and the outer end portion of the shaft 55 is supported in a bearing, as at 65, on a bracket 66 which is mounted longitudinally adjustable on the rear end portion of the pusher bar 31. As shown, the bracket 66 is secured by bolts or the like 67 received in some of the apertures 47 of the pusher bar. However, other means of mounting and adjusting the several power shaft sections may be provided. With the means shown and described, the longitudinal adjustment of the shaft sections is possible and practical for adapting the shafting in the driving of various moving parts of the implements or apparatus carried by the supplemental or auxiliary steering axle provision of the present invention.

The power shaft 55 may be driven by any suitable connection with the regular power take-off of the tractor. As shown, however, a countershaft 68 is provided, it being journaled in the bearing bracket 66 and carrying at its outer end a gear 69 which is in mesh with a similar gear 70 secured on the outer end of the power shaft 55. The inner end portion of this counter-shaft 68 is squared or otherwise suitably arranged and provided for the attachment of a conventional universally-jointed coupling shaft 71 (indicated by dotted lines in Figures 1 and 2) which in turn is attachable to the outlet part 16 of the regular power take-off indicated merely schematically in the drawings. As just above stated, however, any other suitable or approved shaft-driving-power and power connections may be provided.

From the foregoing it is clearly apparent that a supplemental or auxiliary steering axle or adapter is provided for application to the ordinary type of farm tractor and the like not originally provided with the necessary wide gauge steering wheel arrangement or possessing, in itself, the requisite strength, rigidity and stability for pusher type implement carriage and operation, whereby the tractor is reconverted for such use.

It is further obvious that not only is the device of the present invention readily applied to the ordinary narrow-gauge front steering wheel type of tractor, and is of ample weight and strength in itself for the purpose intended, but it does not impose any undue strains and stresses upon the tractor. At the same time, there is a particular and especial advantage in the provision of the supplemental or auxiliary steering wheel assembly of the present in that it is steered by the regular steering mechanism and gear of the tractor without necessitating any alteration whatever in the same, it being only necessary to merely attach the original steering ground wheels 12 of the tractor to the saddle member or turntable 29 of the supplemental or auxiliary steering axle or else remove the wheels and attach the spindle members 17 directly to the saddle member or turntable 29.

There are other obvious advantages in the application and use of the device of the present invention to and upon an ordinary farm tractor of the class described, among which is the increase in the utilitarian value of the tractor and minimization in the cost of necessary farming equipment.

Obviously, the illustrated construction and arrangement is that of only one practical exemplification of the invention. Hence, the same is not in specific limitation, as modification and change is possible and even contemplated within the purview and scope of the invention as defined in the appended claims.

What is claimed is:

1. An attachment for tractors comprising a supplemental and auxiliary steering axle and pusher bar unit for supporting and carrying the forward end portion of a tractor, a saddle member pivotally mounted on the auxiliary steering axle means either to receive the forward ground wheel or wheels of the tractor or the spindles thereof, said pusher unit being rigidly connected to the steering axle and having fittings on its forward end for attaching the unit to an implement to be pushed by the tractor and means at its rear end for attaching the unit to the frame of the tractor.

2. An attachment for tractors comprising a supplemental and auxiliary steering axle unit for supporting and carrying the forward end portion of a tractor, comprising an axle and ground wheels pivotally mounted thereon, a saddle member pivotally mounted on the axle, said saddle member having a longitudinal recess in its upper portion to receive the normal front wheel or wheels of the tractor, said saddle member also having recesses on the top surface thereof to also receive the spindles of the normal tractor wheels with means for anchoring the wheel or wheels of the tractor or the spindles in the saddle member.

3. An attachment for tractors comprising a supplemental and auxiliary steering axle and pusher bar unit for supporting and carrying the forward end portion of the tractor, said unit comprising a saddle member pivotally mounted on said axle, said saddle member having recesses in its upper surface to receive either the normal forward ground wheel means of the tractor or the spindles of the wheels of the tractor, said unit comprising means for attaching the unit to the implement to be pushed by the tractor and means for bracing the auxiliary axle comprising a ramp on which the front wheel or wheels of the tractor ascend before the unit is attached to the tractor.

CHRISTIAN CHRISTIANSEN.

REFERENCES CITED

The following references are of record in the file of this patent:

UNITED STATES PATENTS

| Number | Name | Date |
| --- | --- | --- |
| 1,396,785 | Schofield | Nov. 15, 1921 |
| 1,863,473 | Crisanti | June 14, 1932 |
| 1,868,474 | Strehlow | July 19, 1932 |
| 1,917,962 | Forrest | July 11, 1933 |
| 2,074,685 | Engstrom | Mar. 23, 1937 |
| 2,175,965 | Madden | Oct. 10, 1939 |
| 2,178,505 | Warneke | Oct. 31, 1939 |